US 6,554,489 B2

(12) United States Patent
Kent et al.

(10) Patent No.: US 6,554,489 B2
(45) Date of Patent: Apr. 29, 2003

(54) FIBER OPTIC CABLE GUIDE AND METHOD OF APPLICATION

(75) Inventors: Eric W. Kent, Hickory, NC (US); Darrell R. Childers, Hickory, NC (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/819,571

(22) Filed: Mar. 28, 2001

(65) Prior Publication Data
US 2002/0141723 A1 Oct. 3, 2002

(51) Int. Cl.[7] .................................. G02B 6/36
(52) U.S. Cl. .................. 385/86; 385/135; 385/136; 385/87; 385/76
(58) Field of Search ................. 385/86, 87, 76, 385/135, 53, 56

(56) References Cited

U.S. PATENT DOCUMENTS

| 5,037,175 | A | | 8/1991 | Weber .................. 385/76 |
|---|---|---|---|---|
| 5,101,463 | A | * | 3/1992 | Cubukciyan et al. ......... 385/69 |
| 5,347,603 | A | * | 9/1994 | Belenkiy et al. ............... 385/76 |
| 5,528,712 | A | * | 6/1996 | Belenkiy et al. ............... 385/78 |
| 5,640,476 | A | * | 6/1997 | Womack et al. ............... 385/76 |
| 5,710,851 | A | * | 1/1998 | Walter et al. ................ 385/100 |
| 5,857,046 | A | * | 1/1999 | Barkus et al. ................. 385/53 |
| 6,134,370 | A | * | 10/2000 | Childers et al. .......... 174/74 R |
| 6,152,607 | A | * | 11/2000 | Weigel ........................ 385/56 |

* cited by examiner

Primary Examiner—Robert H. Kim
Assistant Examiner—Richard Kim
(74) Attorney, Agent, or Firm—Timothy J. Aberle; Kevin M. Able (57) ABSTRACT

A fiber optic cable guide is disclosed for holding fiber optic cable in a bend without violating the minimum bend radius. The guide is a removably attachable to the fiber optic cable. Duplex embodiments and related methods of use are also disclosed.

48 Claims, 8 Drawing Sheets

FIBER OPTIC CABLE GUIDE AND METHOD OF APPLICATION

FIELD OF THE INVENTION

The invention relates generally to a fiber optic cable guide to permit bendable installation of optical fiber cables and a method of application of the guide to a cable. More particularly, the invention is directed to a fiber optic cable guide that is removably attachable to a connector subassembly disposed at an end of the fiber optic cable and to a related method.

BACKGROUND OF THE INVENTION

Often a fiber optic cable is terminated in a constrained enclosure such as a small cabinet or elsewhere where space is otherwise limited. Sometimes a fiber optic cable is required to bend through about ninety degrees shortly after the termination point. If appropriate care is not given the cable, the bending of the cable may violate the minimum bend radius of the optical fiber, which could lead to attenuation and even breakage of the optical fiber in the cable. Various types of guides have been developed for bendably connecting fiber optic cables to other components without violating the minimum bend radius of the fiber optic cable. For example, guides are available such as those shown in U.S. Pat. Nos. 6,134,370; 5,710,851; 5,640,476; 5,347,603; and 5,037,175.

However, these guide devices include various disadvantages, such as bulkiness that may preclude their use in some applications, especially where small connectors or tight spaces are involved. Also, some of these devices cover most or all of the cable within the bend, making it difficult or impossible to visually detect which cable (for example, according to its color or markings) extends into a given connector. This difficulty can be increased where a large number of cables are connected in a group or where the connected cables extend out of sight beyond the guide. Some of the above guides also must be installed prior to the connector being installed on the optical fiber. Also, some of these devices include the guide as a permanent part of the connector itself, such as incorporating the guide into the boot, thereby precluding the ability to selectively provide a non-guided (i.e., non-bending) connector in the field. Some of these devices are also not readily rotatable relative to the connector after attachment to the connector, thereby limiting installation flexibility. Finally, the devices do not provide for a simple and reliable removal of a cable from the guide, either by choice or in case of an inadvertent snagging of a cable.

SUMMARY OF THE INVENTION

A fiber optic cable guide is disclosed for removable placement on a connectorized fiber optic cable assembly having a fiber optic cable and at least one connector subassembly. The fiber optic cable has a minimum bend radius. The fiber optic cable guide includes an elongated member at least partially curved along its length with a radius of curvature not less than the minimum bend radius of the fiber optic cable for guiding the fiber optic cable in a desired direction. The elongated member has a first end, a second end, a middle section between the first and second ends, and a channel extending from the first end to the second end for receiving the fiber optic cable. The first end is configured to be removably disposed around a portion of the connector subassembly. The second end includes at least one primary securement element extending from the second end and configured to releasably hold at least the fiber optic cable to the elongated member. The middle section includes at least one secondary securement element extending from the middle section and configured to releasably hold at least the fiber optic cable to the elongated member. The primary securement element is configured so that the fiber optic cable is releasable from the primary-securement element upon pulling the fiber optic cable at a first predetermined force in a direction generally away from a bottom of the channel.

The secondary securement element may be configured so that the fiber optic cable is releasable from the secondary securement element upon pulling of the fiber optic cable at a second predetermined force in the direction generally away from the bottom of the channel. The second predetermined force may be greater than the first predetermined force, or the second predetermined force may be substantially equal to the first predetermined force.

The at least one primary securement element may extend arcuately over a portion of the channel, and the second end may include at least two primary securement elements. The at least two primary securement elements may be disposed at two different axial positions along the second end of the elongated member, or the at least two primary securement elements may be disposed opposite each other at a common axial position along the second end of the elongated member, thereby forming a substantially C-shape with the second end.

The connector subassembly may include a strain relief boot, and the at least one primary securement element may be configured to hold the elongated member to the strain relief boot. The first end of the elongated member may be configured to allow the elongated member to rotate 360 degrees relative to the connector subassembly. The first end of the elongated member may have a receptacle extending from the first end, the receptacle defining a longitudinally-extending channel therethrough and a longitudinally-extending slot in communication with the channel. The receptacle may be substantially C-shaped. The slot may be configured to allow the fiber optic cable to be slid radially therethrough. If connector subassembly includes a strain relief boot, the receptacle may be configured to be removably disposed around the boot.

The at least one secondary securement element may be configured to allow axial movement of the fiber optic cable relative to the elongated member, or may be configured to be crimpable around the fiber optic cable to thereby substantially preclude axial movement of the fiber optic cable relative to the elongated member.

The middle section may have at least two secondary securement elements, which may be disposed at two different axial positions along the middle section of the elongated member, or which may be disposed opposite each other at a common axial position along the middle section end of the elongated member, thereby forming a substantially C-shape with the middle section. The at least one secondary securement element may also extend across a center of the channel.

The elongated member may be curved through about 90 degrees, and the channel may have a width that decreases in the direction of the first end to the second end.

Also, the elongated member may include at least one stiffening element. If desired, two ribs extending along the elongated member may be provided for stiffening. The stiffening element may be disposed proximate the secondary securement element or proximate an opening through the elongated member.

According to another aspect of the invention, a fiber optic cable guide is disclosed for removable placement on a connectorized fiber optic cable assembly having a fiber optic cable and at least one connector subassembly. The fiber optic cable has a minimum bend radius. The fiber optic cable guide includes an elongated member at least partially curved along its length with a radius of curvature not less than the minimum bend radius of the fiber optic cable for guiding the fiber optic cable in a desired direction. The elongated member has a first end, a second end, a middle section between the first and second ends, and a channel extending from the first end to the second end for receiving the fiber optic cable. The first end includes a substantially C-shaped receptacle for releasably holding a portion of the connector subassembly. The second end includes two primary securement elements extending from the second end to releasably hold at least the fiber optic cable. The middle section includes one secondary securement element extending from the middle section to releasably hold at least the fiber optic cable. The primary securement elements are configured so that the fiber optic cable is releasable from the primary securement elements upon pulling the fiber optic cable in a direction generally away from a bottom of the channel.

According to another aspect of the invention, a fiber optic cable guide is disclosed for removable placement on a connectorized fiber optic cable assembly having a fiber optic cable and at least one connector subassembly including a strain relief boot. The fiber optic cable has a minimum bend radius. The fiber optic cable guide includes an elongated member curved along its length with a radius of curvature not less than the minimum bend radius of the fiber optic cable. The elongated member has a first end, a second end, a middle section between the first and second ends, and a channel extending from the first end to the second end for receiving the fiber optic cable and the strain relief boot. The first end is removably attached to the strain relief boot. The second end includes at least one primary securement element extending from the second end to releasably hold the fiber optic cable to the elongated member substantially within the channel. The primary securement element is configured so that the fiber optic cable is releasable from the primary securement element upon pulling the fiber optic cable in a direction away from a bottom of the channel.

The elongated member may be forked. Each connector subassembly may include a strain relief boot and each receptacle may be disposed around a respective strain relief boot. The elongated member may include two channels extending from the first end to the second end, each channel for receiving a respective fiber optic cable. The primary securement elements may be configured so that the respective fiber optic cables are releasable upon pulling of the fiber optic cable in a direction away from a bottom of the respective channel. A middle section may be included between the first and second ends and two secondary securement elements disposed on the middle section, each secondary securement element for holding a respective fiber optic cable.

According to another aspect of the invention, a method is disclosed of removably fixing a fiber optic cable in a curvature not greater than that defined by a minimum bend radius of the fiber optic cable, a connector subassembly being disposed at at least one end of the fiber optic cable. The method includes the steps of radially inserting the fiber optic cable into a first end of a guide member, the first end being configured to be disposed around a portion of the connector subassembly, the guide member being at least partially curved along its length with a radius of curvature not less than the minimum bend radius and defining a channel for receiving the fiber optic cable extending from the first end of the guide member to a second end of the guide member, and radially inserting the fiber optic cable in a direction toward the bottom of the channel past at least one securement element extending from the guide member spaced from the first end to hold the fiber optic cable to the guide member.

Further steps may include inserting the fiber optic cable past at least another securement element axially spaced from the at least one securement element, crimping one of the securement elements over the fiber optic cable, axially sliding the guide member along the fiber optic cable after the first radially inserting step, removing the fiber optic cable from the guide member by pulling the cable radially from the at least one securement element, or rotating the guide member relative to the fiber optic cable to a desired orientation after the radially inserting steps.

It is to be understood that both the foregoing general description and the following detailed description are exemplary and explanatory only and are not restrictive of the invention as claimed.

For better understanding of the present invention, reference is made to the following description taken in conjunction with the accompanying drawings and its scope will be pointed out in the appending claims.

BRIEF DESCRIPTION OF THE DRAWINGS

The above and other aspects and advantages of the present invention are apparent from the detailed description below in combination with the drawings, in which.

DETAILED DESCRIPTION OF THE INVENTION

Detailed reference will now be made to the drawings in which examples embodying the present invention are shown. The drawings and detailed description provide a full and detailed written description of the invention and of the manner and process of using it so as to enable one skilled in the pertinent art to make and use it as well the best mode of carrying out the invention. However, the examples set forth in the drawings and detailed description are provided by way of explanation of the invention and are not meant as a limitation of the invention. The present invention thus includes any modifications and variations of the following examples as come within the scope of the appended claims and their equivalents.

The detailed description uses numerical and lettered designations to refer to figures in the drawings. Like or similar designations in the drawings and description have been used to refer to like or similar parts of the invention, in particular with reference to corresponding parts in different embodiments.

A first embodiment of a fiber optic cable guide 20 according to the invention is shown in FIGS. 1–5. The fiber optic cable guide 20 is suitable for removable placement on a connectorized fiber optic cable or cable assembly. The fiber optic cable guide 20 includes an elongated member 22 having a first end 24, a middle section 26, and a second end 28. The elongated member 22 defines a channel 23 extending from the first end 24 to the second end 28. The second end 28 has at least one primary securement element in the form of an extension 30 and the first end 24 has a receptacle 32.

The receptacle 32 and extension 30 are configured and sized to be removably attached to and safely guide a fiber optic cable 48 through a predetermined bend without violating the minimum bend radius of the fiber optic cable. The cable 48 and a connector subassembly 49 together form what is referred to herein as connectorized fiber optic cable assembly 46 (which may also have a connector at a second end of cable 48). As shown, assembly 46 is terminated by an LC connector, but it should be understood that the present invention has applications with various types of connectors. Connector subassembly 49 may include a strain relief boot 50a or 50b attached to a housing 51 and a trigger member 53 attached to the housing.

It should also be understood that use of the term "connectorized" is meant to refer both to cables connectorized by a technician in the field and to cables connectorized during initial manufacture. Thus, "connectorized" is intended only to indicate that the fiber optic cable has at least one connector, regardless of how or when installed.

If desired, the extensions 30 may be provided in one or two mating pairs. As shown in FIGS. 1–5 two pairs of the mating extensions 30 are provided. A slot 31 is disposed between each mating extension pair to allow the cable 48 and possibly the strain-relief boot (as described below in relation to the inventive method) to be slid radially through the slot 31 between extensions 30. It should be understood that the two pairs of mating extensions 30 could be replaced with a single mating pair, if desired. Alternately, each pair could be replaced by a single extension or only a single extension could be employed and still be within the scope of the invention.

Figure 1:
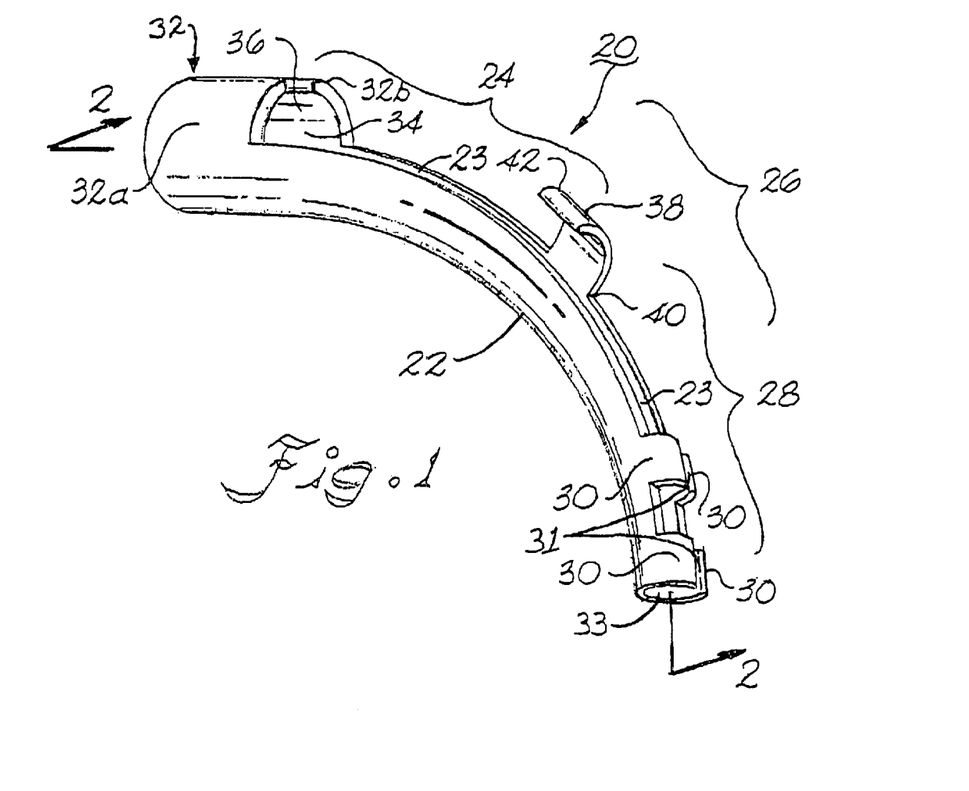
FIG. 1 is a left side perspective view of one embodiment of a fiber optic cable guide according to the present invention.

As shown, the extensions 30 are arcuate and form a channel 33 in communication with the slot 31. Channel 33 is coextensive with the channel 23 within the extensions 30.

Figure 4:
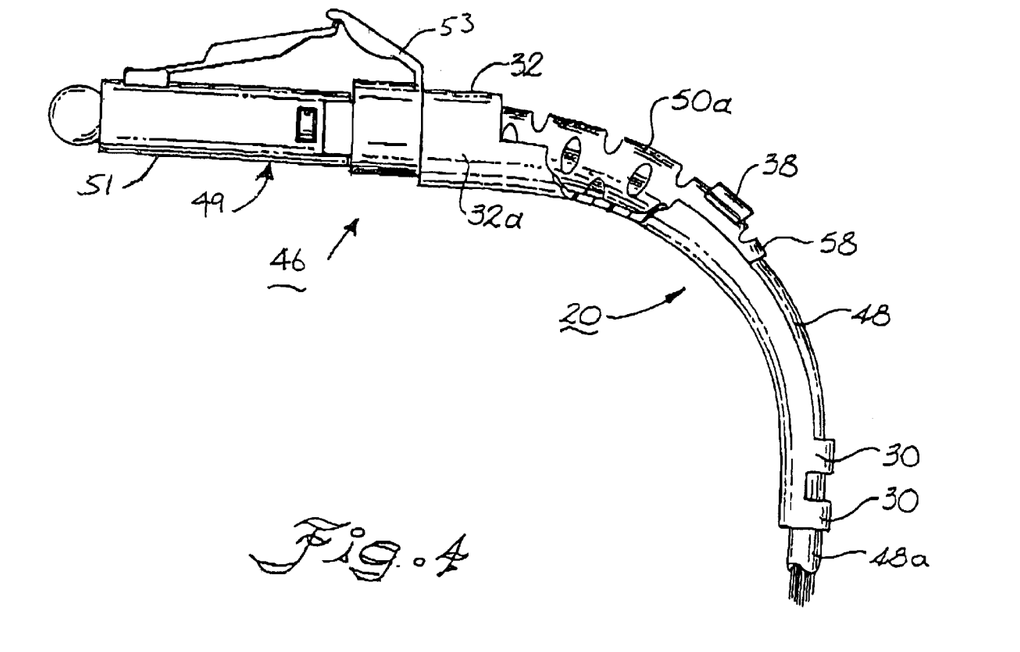
FIG. 4 is a partial sectional elevational view of the fiber optic cable guide of FIG. 1, also showing use with a connector subassembly and cable.

As shown, a mating pair of extensions 30 are substantially C-shaped, so as to conform to the cable and/or boot exterior. The extensions 30, whatever their number or form, are configured to be removably disposed around at least a portion of the connectorized cable assembly. FIG. 4 shows the extensions 30 disposed around the cable 48 only, while FIG. 5 shows the extensions 30 disposed around the cable 48 and a boot 50b (boot 50a in FIG. 4 does not extend along the cable to the extensions).

The receptacle 32 is configured to be removably disposed around a portion of the connector subassembly 49. One example of the receptacle, as shown, includes a longitudinally-extending channel 34 (coextensive with channel 23 within the receptacle) and a longitudinally-extending slot 36 that cooperate to permit at least a portion of the cable assembly 46 to be radially inserted into the channel. The receptacle 32 may also be, by way of example, substantially C-shaped. Thus, receptacle 32 is formed of two sides 32a and 32b that may be similar to a mating pair of extensions 30, as described above. Slot 36 should be wide enough for the cable 48 to pass through radially, and may also be wide enough for at least a portion of the boot 50a or 50b to pass therethrough.

Figures 5, 6:
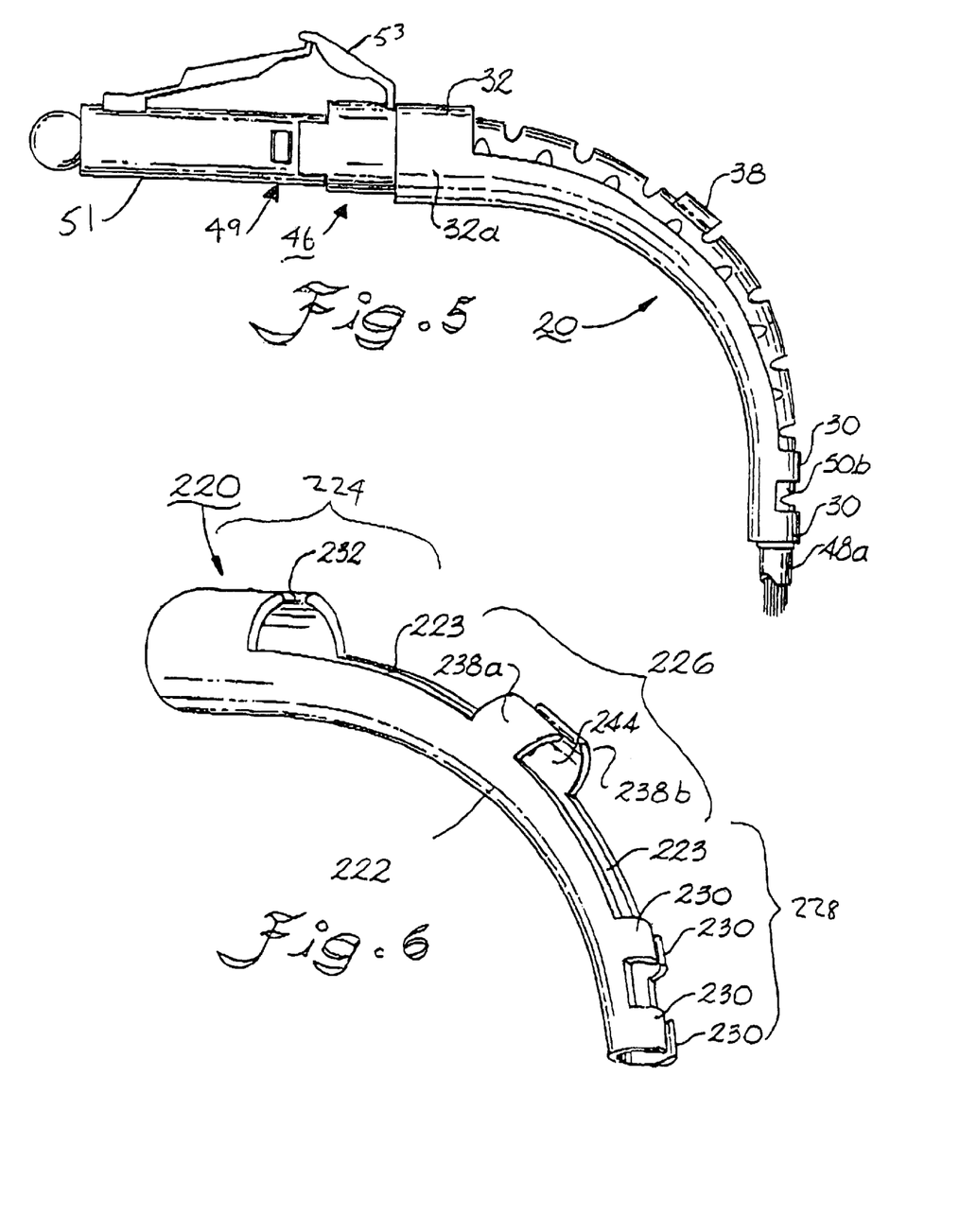
FIG. 5 is a side elevational view of the fiber optic cable guide of FIG. 1, also showing use with an alternate connector subassembly and cable.
FIG. 6 is a left side perspective view of an alternative embodiment of a fiber optic cable guide.

In use, receptacle 32 and channel 34 releasably secure the elongated member 22 to a portion of the connector subassembly 49, namely the boot 50a or 50b (see FIGS. 4 and 5). The receptacle 32 may be configured to grip the boot 50a or 50b so as to allow the cable subassembly 46 to rotate 360 degrees relative to the elongated member 22. If the boot shape is altered, the receptacle 32 may be altered accordingly, whether to allow secure attachment or to ensure rotatability, or both. Such relative rotatability allows for flexibility during installation and maintenance, while still providing minimum bend radius protection. The boot may be configured to accept the guide for example, by providing a groove (not shown) in its outer surface. The receptacle could also be attached to a part of the connector housing 51, if desired.

The fiber optic cable guide 20 and its channel 23 may be relatively wider near the first end 24 and the receptacle 32 and may decrease in width and diameter towards the second end 28 and extension 30, as shown. Alternately, the fiber optic cable guide 20 may be axially uniform, having a width equal to that of the channel 34 from the first end and 24 to the second end 28. The configuration may also be dictated or altered to fit different cable and/or boot configurations and still be within the scope of the invention.

At least one secondary securement element 38 may also be included on guide 20. If so, the securement element 38 may extend from the middle section 26 and may be configured to extend across a center of the channel 23. The secondary securement element 38 has a proximal end 40 attached near the middle section 26 of the elongated member 22 and a distal end 42 extending away from the proximal end. The distal end 42 of the secondary securement element 38 may be loosely restrictive relative to the cable 48 and therefore freely allow axial and rotational movement of the cable 48 relative to the elongated member 22 (i.e., both sliding and rotating). Alternatively, the secondary securement element 38 can grip the fiber optic cable 48 tightly (via boot 50a or 50b) so as to eliminate sliding unless the cable is pulled with a fair amount of force, or even can be crimped around the fiber optic cable to preclude sliding in most conditions. To be crimpable, securement element 38 and possibly all of guide 20, would have to be made of a deformable material, such as a metal.

As shown, the secondary securement element 38 of the first embodiment extends arcuately, and its distal end 42 extends across the center of the channel 23 and therefore further circumferentially around the cable 48 and the boot 50a or 50b than do the arms 32a or 32b or the extensions 30. Thus, the cable 48 must be carefully fed around the secondary securement element 38, if the secondary securement element is so configured, so as to avoid damaging the cable during insertion and especially during removal.

In the exemplary embodiment as shown, the elongated member 22 is curved for at least a portion of its length. More particularly, the member 22 is curved through about ninety degrees but it may also be curved through other angles as desired. Regardless of the circumferential length of the curvature, the curvature (see FIG. 2) should not have a radius of curvature r smaller than the minimum bend radius of the fiber optic cable 48.

Figure 2:
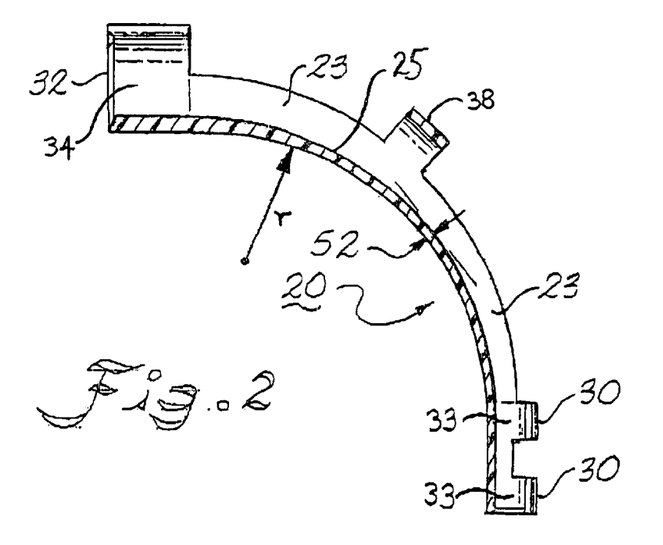
FIG. 2 is a sectional view of the fiber optic cable guide taken along line 2—2 in FIG. 1.
Figure 3:
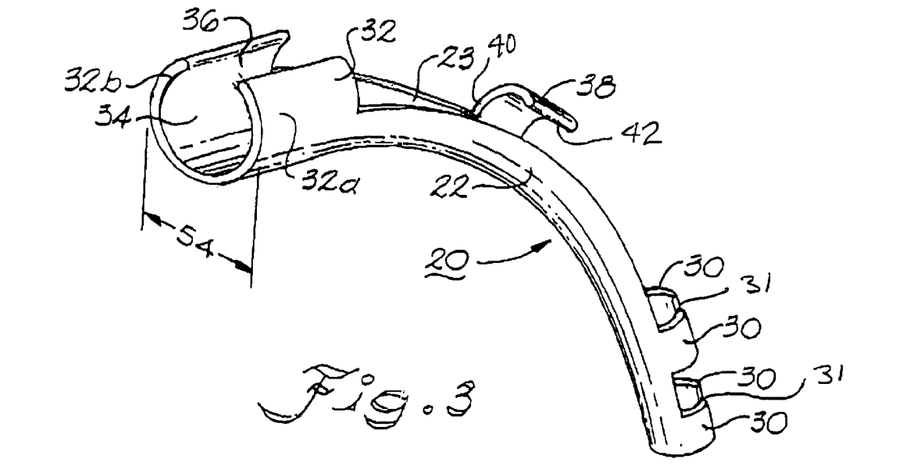
FIG. 3 is a top perspective view of the fiber optic cable guide of FIG. 1.

As shown in FIG. 2, the elongated member 22 has a thickness 52 that extends in a plane through which the radius of curvature of the elongated member is curved. The thickness 52 increases in the direction of the first end 24 to provide more strength at that end and more flexibility at the second end 28. If desired, however, the thickness 52 may be uniform from the first end 24 to the second end 28, or may vary in other ways, whether uniformly or otherwise, as called for in particular applications.

The elongated member 22 also has a width 54 (FIG. 3) perpendicular to the plane of the radius of curvature. Put another way, a bottom 25 (see FIG. 2) of channel 23 extends along the member 22 in a plane aligned with the radius of curvature r. However, if desired, the curvature could extend in the direction of the width 54, or in some other direction rather than in the direction of the thickness 52. Thus, the plane which the radius of curvature extends could be at an angle to or even perpendicular to the plane in which the section was taken in FIG. 2, as will be discussed below with reference to FIG. 10.

Of course, the guide 20 could be attached on or rotated to anywhere around connector subassembly 46. For example, the guide 20 (as shown) could be mounted on the connector subassembly 46 with the guide 20 curving down, up, or sideways, regardless of the direction of curvature. Thus, it should be understood that various orientations of the elements described above relative to the curvature of the guide 20 are possible within the scope of the invention.

As shown in FIGS. 4 and 5, the extensions 30 may radially engage the cable 48 or an extended strain relief boot 50a or 50b disposed about the cable. The fiber optic cable 48 and the boot 50 may be releasably held by the extension 30 until a user pulls end 48a of the fiber optic cable 48 away from the extension in a direction generally away from the bottom 25 of the channel 23 (to the right in FIGS. 4 and 5). Pulling on the cable 48 causes the cable 48/boot 50 to be pulled through the extension 30, thereby releasing the fiber optic cable/boot if pulling is done with force of at least a first predetermined force. The distance between extensions 30 may be configured to release the fiber optic cable/boot upon such pulling with less or more pulling force without causing stress on the fiber cable that could cause attenuation and eventually breakage of the optical fiber in the cable. Securement element 38 provides protection for the fiber optic connector by reducing the force on the connector when the cable is pulled upward relative to the guide 20 with a force that is greater than the first predetermined force. However, due to the extent of extension of the securement element 38, if the cable 48 is to be removed from the guide one should take care to feed the fiber optic cable around and out of the securement element of this embodiment during continued pulling.

The primary securement element may be sized so as to allow the cable 48 to be released from the guide upon inadvertent snagging of the cable. If so, the possibility is greatly increased for avoiding damage to the cable 48. Of course, if the cable is more violently pulled, damage to the optical fiber may be unavoidable. With the slots 31 disposed radially above the bottom 25 of channel, rather than to the side, it is also simple to tug the cable 48 upward (away from the bottom 48 of the channel 23) to remove it from the second end 28 when one wants to remove the guide 20 from the connectorized cable assembly 46, or the assembly itself from a receptacle (not shown). The slots and extensions may be thus designed so as to allow the cable 48 to slide out of the slots radially at a first predetermined force, at which a damaging bend of the cable around second end 28 would not occur.

According to another embodiment of the invention as shown in FIG. 6, the middle section 226 of guide 220 may have at least two secondary securement elements 238a and 238b that further radially secure a connectorized assembly (not shown) to the elongated member 222. The securement elements 238a and 238b would both extend a lesser distance over the cable than does the securement element 38, and they more readily allow removal of the cable if pulled upward from the guide 220. Thus, elements 238a and 238b do not extend over the center of channel 223 and are more akin to a mating pair of extensions 30. Thus, the cable can be pulled upward out of elements 238a and 238b, unlike element 38 of the first embodiment.

If desired, the secondary securement elements 238a, 238b may be sized so as to allow the cable 48 and boot 50a/50b to slide radially outward in a direction away from the bottom 225 of the channel 223 when the cable is pulled at a second predetermined force. The second predetermined force may be greater than or the same as the first predetermined force. If elements 238a, 238b are utilized, sequential or higher levels of protection of the cable if pulled or snagged may be provided depending on the magnitude, speed, and number of pulls the cable experiences.

Figure 7:
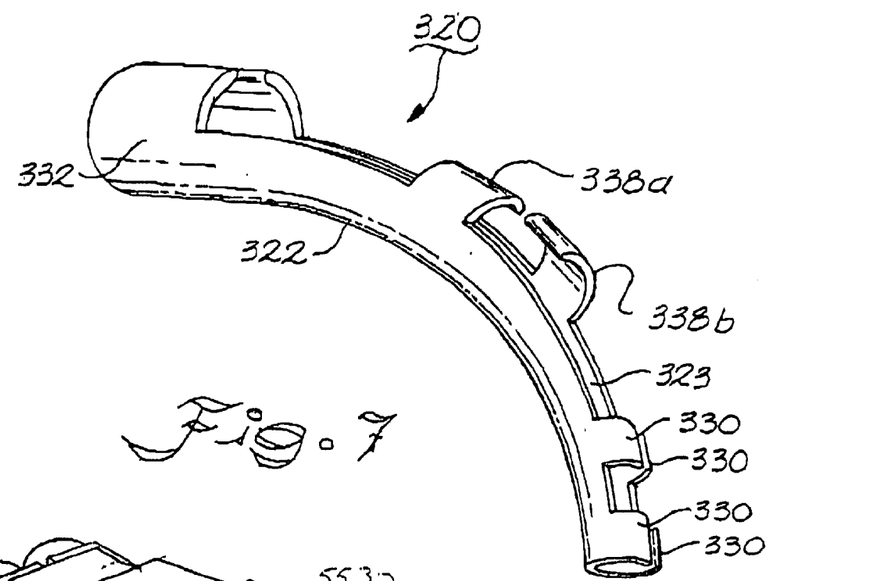
FIG. 7 is a perspective view of another alternate embodiment of a fiber optic cable guide having offset securement elements.

According to another embodiment of the invention as shown in FIG. 7, securement elements 338a and 338b are disposed on a central location of elongated member 322 of guide 330. Securement elements 338a and 338b are offset relative to each other and overlap relative to the center of channel 323. Thus, elements 338a and 338b can be dimensioned the same or similar to element 38. This embodiment requires that the cable be either slid or manipulated sequentially in two opposing directions around the elements 338a and 338b to remove or insert a cable subassembly from or into the guide 320.

Figure 8:
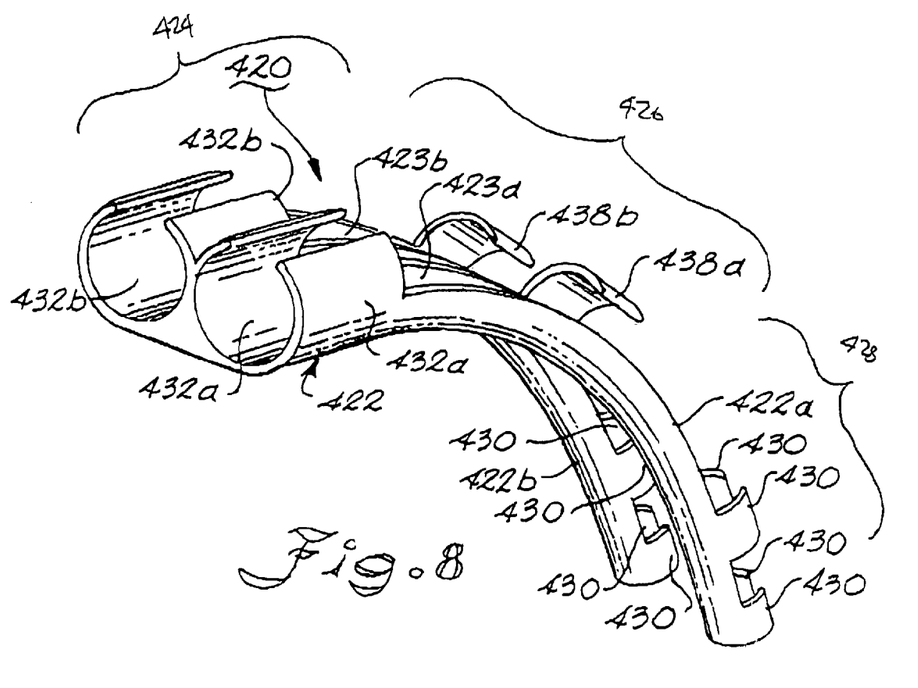
FIG. 8 is a top perspective view of an alternative duplex embodiment of a fiber optic cable guide.

A further embodiment of the invention is shown in FIG. 8 in which a multiplex fiber optic cable guide 420 is configured for removable placement on at least two fiber optic cables 448. Guide 420 as shown includes a forked elongated member 422 having dual guide bodies 422a and 422b with dual channels 423a and 423b. As shown in FIG. 8, receptacles 432a and 432b may be used to guide the fiber optic cables in a desired direction. At least two securement elements 438a and 438b may be used to secure the fiber optic cables. Elements 438a and 438b overlap the center of channel 423, as with element 38, although they may be configured as are elements 238 or 338, if desired. Extensions 430 are also provided to receive fiber optic cables (not shown).

At the first end 424 of member 422, the receptacles 432a and 432b are joined. At the middle section 426 and second end 426, dual guide bodies 422a and 422b extend outwardly separately from the first end 424. However, the guide bodies 422a and 422b could be joined along some or all of their lengths, if desired.

Figure 9:
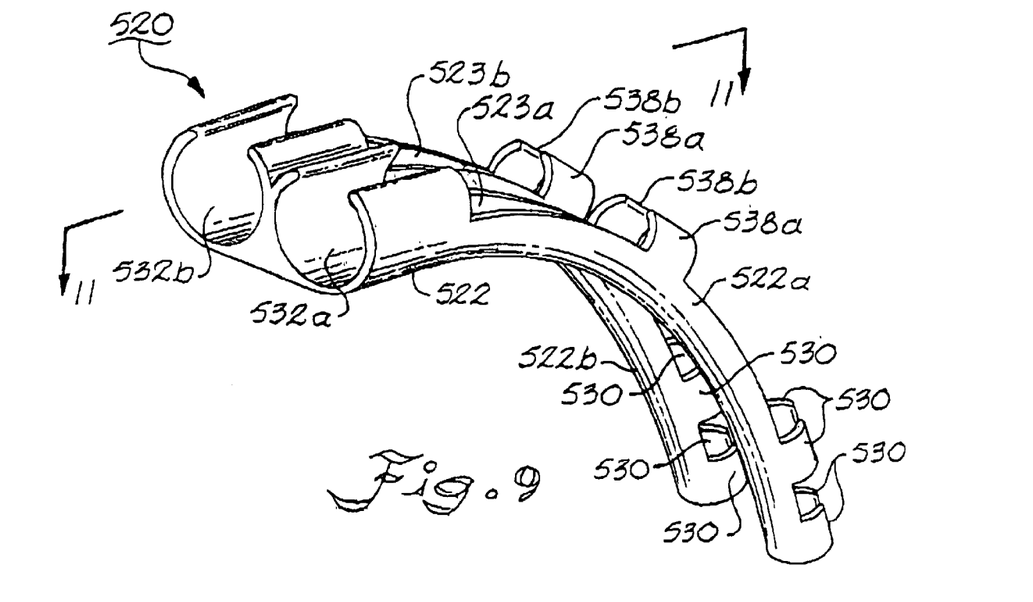
FIG. 9 is a top perspective view of another alternate duplex embodiment of a fiber optic cable guide.
Figure 10:
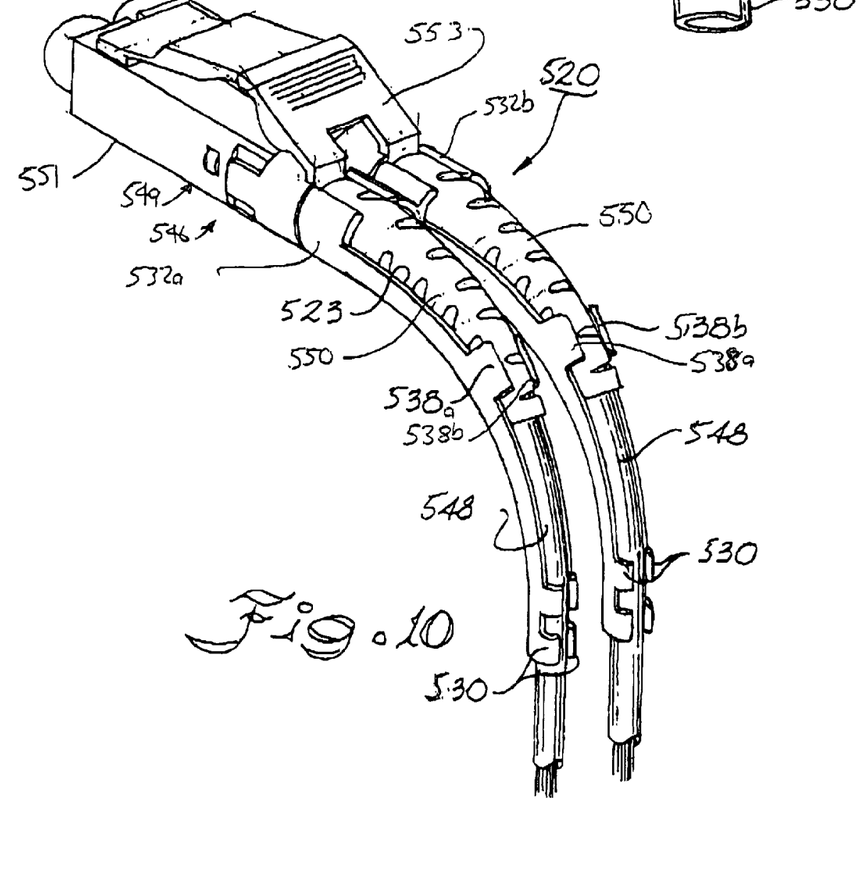
FIG. 10 is a left side perspective view of the fiber optic cable guide of FIG. 9 with two connector subassemblies and cables.
Figure 11:
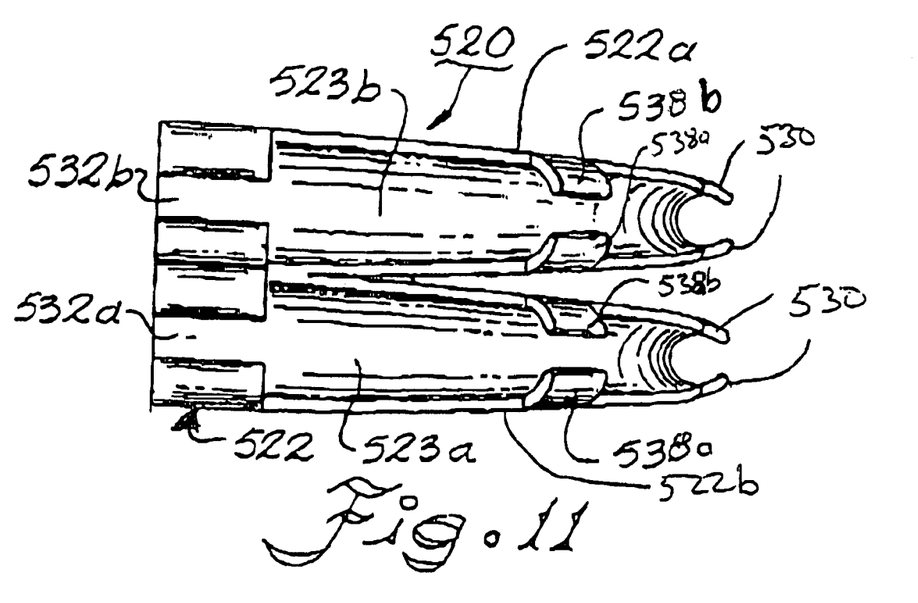
FIG. 11 is a top view of fiber optic cable guide of FIG. 9.

FIGS. 9–11 show an alternative embodiment of a multiplex fiber optic cable guide 520 having a forked elongated member 522 having dual guide bodies 522a and 522b. Guide 520 differs from guide 420 in that guide 520 includes at least two securement elements 538a and 538b on each of guide body 522a and 522b. Elements 538a and 538b do not extend over channels 523a and 523b, as with elements 238a and 238b. FIG. 10 shows two cable assemblies 546 secured to guide 520.

Figure 12:
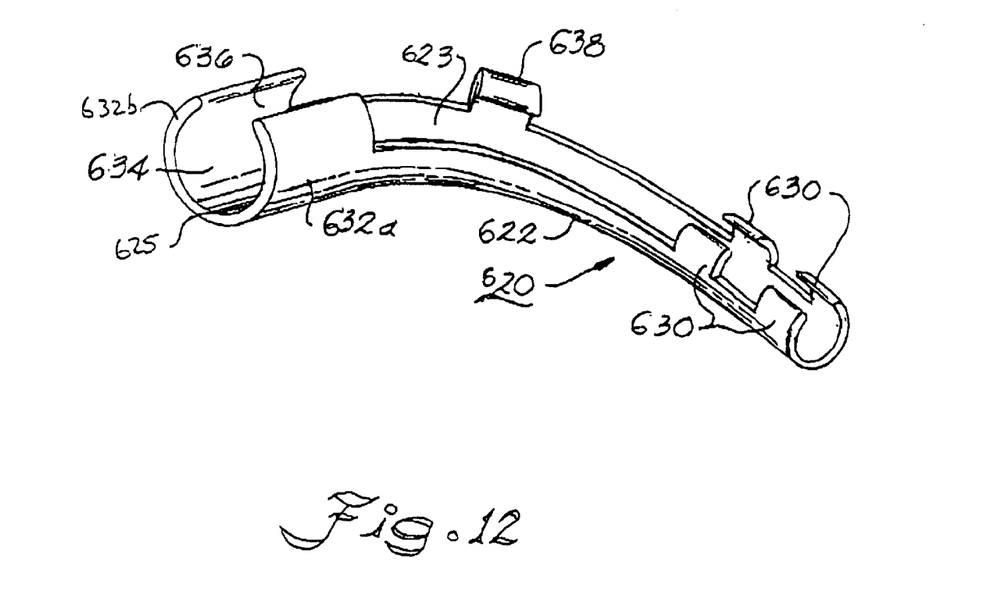
FIG. 12 is a left side perspective view of another embodiment of a fiber optic cable guide according to the present invention.

FIG. 12 shows an alternative embodiment a fiber optic cable guide 620 including an elongated member 622 that is similar to that in FIGS. 1–5, except that the curvature of guide 620 extends essentially laterally with reference to the bottom 625 of the channel 623. Guide 620 demonstrates that the curvature of the guide could extend in various directions with reference to the channel.

Figures 13, 14:
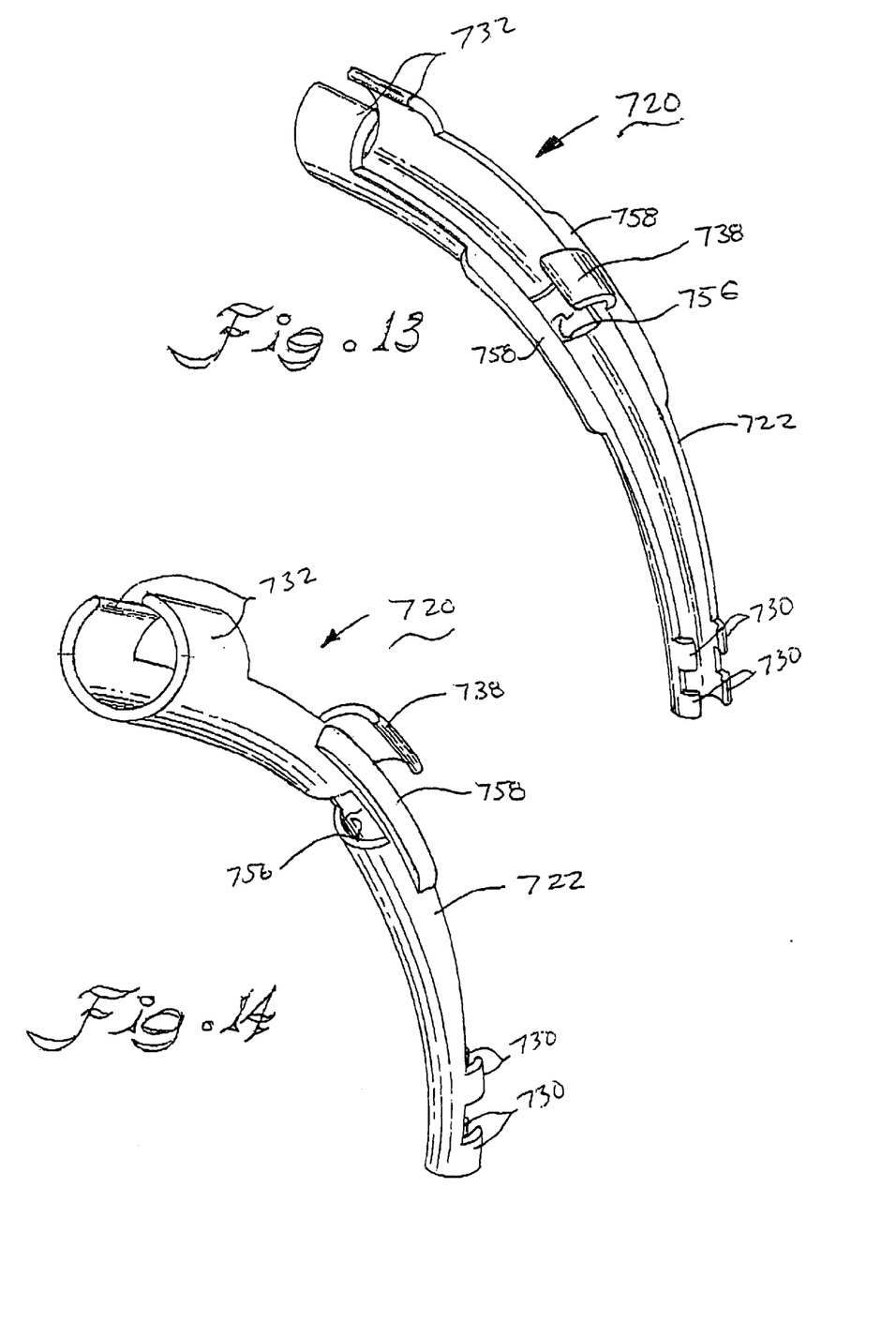
FIG. 13 is a top perspective view of another embodiment of a fiber optic cable guide according to the present invention.
FIG. 14 is a bottom perspective view of the fiber optic cable guide of FIG. 13.

FIGS. 13 and 14 show another alternative embodiment of a fiber optic cable guide according to the present invention. As shown, fiber optic cable guide 720 includes an elongated member 722 that is similar to that shown in FIGS. 1–5, except that an opening 756 is located proximate securement element 738. Opening 756 is also located proximate at least one stiffening element. As shown, the stiffening element may comprise a rib 758 extending along elongated member 722. Fiber optic cable guide 720 as shown includes two such ribs 758 flanking opening 756. Ribs 758 are also located proximate securement element 738, as shown.

An opening (such as opening 756) may have to be formed in the elongated member 722, if the part is made by molding. The presence, size, and location of such an opening is thus dependent on the molding procedure. Thus, opening 765 is not necessarily a required part of the fiber optic cable guide structure according to the present invention, although various openings, shapes, and locations could be included within an elongated member to alter the amount of material, shape, flexibility, etc. of the member within the scope of the present invention. The use of the at least one stiffening element (in this case two ribs 758) in the embodiment of FIGS. 13 and 14 compensates for the loss of stiffness in elongated member 722 caused by the presence of opening 756. The stiffening element also provides a slightly larger surface that can make grasping the elongated member easier in some situations.

It should be understood that the shape and number of stiffening elements could be altered within the scope of the invention. Also, a stiffening element may not be needed, even if a hole is present in the elongated member. Furthermore, at least one stiffening element may be provided on the elongated member regardless of whether any opening extends through the elongated member, and at any desired location along the elongated member whether disposed near an opening, a securement element, or elsewhere. Further, at least one stiffening element may be provided on any of the previously discussed embodiments to stiffen the elongated member.

By way of example with reference to guide 20, a method of using the disclosed guides is to radially insert the fiber optic cable 48 through into the first end 24 of the guide member 20. Thus, cable 48 could be slid through slot 36. Then, the guide member 20 could be slid axially along the cable 48 until the guide member releasably engages the connector subassembly 49. At this point, the cable can be radially inserted or threaded into the primary and/or secondary securement elements, and then the guide can be rotated into position, if desired. Alternately, any rotation may take place before additional inserting or threading. Also, the axial sliding step can take place after all of the inserting and sliding steps, or the radial insertion could occur with the first end 24 engaging the connector subassembly 49 immediately (i.e., snapping on without requiring axial sliding afterwards).

To remove the cable, the cable may be pulled upwardly in a direction generally away from the bottom 25 of the channel 23 until the cable clears at least the primary securement element(s). Then, the cable may be sequentially pulled from or threaded around the secondary securement elements, if present. Then, the guide may be radially slid off the connector subassembly (boot), or may be axially slid down the cable prior to radial sliding.

Preferably, the guide is made of plastic, but any material could be used that has sufficient strength to cause the boot and cable to curve along the guide. Various other materials, including metals could thus be employed, as could readily be selected by one skilled in the art provided with the present disclosure.

It will be apparent to those skilled in the art that various modification and variations can be made in the present invention without departing from the scope and spirit of the invention. For example, specific shapes of various elements of the illustrated embodiments may be altered to suit particular connector or receptacle applications. Thus, the guides disclosed could be used with or ribbon type cable, and could be reconfigured to be flatter, or smaller or larger, if necessary to do so. Also, the various different configurations and numbers of securement elements could be switched among the embodiments, or the configurations of the receptacle, securement elements, and extensions could also be switched or modified, if desired, to suit the various cable assemblies currently available or that will be available in the future. It is intended that the present invention include such modifications and variations as come within the scope of the appended claims and their equivalents.

We claim:

1. A fiber optic cable guide for removable placement on a connectorized fiber optic cable assembly having a fiber optic cable and at least one connector subassembly, the fiber optic cable having a minimum bend radius, the fiber optic cable guide comprising:

an elongated member at least partially curved along its length with a radius of curvature not less than the minimum bend radius of the fiber optic cable for guiding the fiber optic cable in a desired direction, the elongated member having a first end, a second end, a middle section between the first and second ends, and a channel extending from the first end to the second end for receiving the fiber optic cable, the first end configured to be removably disposed around a portion of the connector subassembly, the second end including at least one primary securement element extending from the second end, said primary securement element being associated with a cable slot sized to allow a cable to be inserted in or removed from said channel and being configured to releasably hold at least the fiber optic cable to the elongated member, the middle section including at least one secondary securement element extending from the middle section and configured to releasably hold at least the fiber optic cable to the elongated member, the primary securement element being formed of a material that is sufficiently flexible to yield to the cable, and being configured to extend over at least a portion of said channel so that upon application of a predetermined force to said cable, and said cable is moved away from said channel, said primary securement element resiliently deflects, and said slot expands to allow egress of said cable away from said channel without damage to said cable.

2. The fiber optic cable guide of claim 1, wherein the secondary securement element is configured so that the fiber optic cable is releasable from the secondary securement element upon pulling of the fiber optic cable at a second predetermined force in the direction generally away from the bottom of the channel.

3. The fiber optic cable guide of claim 2, wherein the second predetermined force is greater than the first predetermined force.

4. The fiber optic cable guide of claim 2, wherein the second predetermined force is substantially equal to the first predetermined force.

5. The fiber optic cable guide of claim 1, wherein the at least one primary securement element extends arcuately over a portion of the channel.

6. The fiber optic cable guide of claim 1, wherein the second end includes at least two primary securement elements.

7. The fiber optic cable guide of claim 6, wherein the at least two primary securement elements are disposed at two different axial positions along the second end of the elongated member.

8. The fiber optic cable guide of claim 6, wherein the at least two primary securement elements are disposed opposite each other at a common axial position along the second end of the elongated member, thereby forming a substantially C-shape with the second end.

9. The fiber optic cable guide of claim 1, wherein the connector subassembly includes a strain relief boot, and the at least one primary securement element is configured to hold the elongated member to the strain relief boot.

10. The fiber optic cable guide of claim 1, wherein the first end of the elongated member is configured to allow the elongated member to rotate 360 degrees relative to the connector subassembly.

11. The fiber optic cable guide of claim 1, wherein the first end of the elongated member has a receptacle extending from the first end, the receptacle defining a longitudinally-extending channel therethrough and a longitudinally-extending slot in communication with the channel.

12. The fiber optic cable guide of claim 11, wherein the receptacle is substantially C-shaped.

13. The fiber optic cable guide of claim 11, wherein the connector subassembly includes a strain relief boot, and the receptacle is configured to be removably disposed around the boot.

14. The fiber optic cable guide of claim 11, wherein the slot is configured to allow the fiber optic cable to be slid radially therethrough.

15. The fiber optic cable guide of claim 1, wherein the at least one secondary securement element is configured to allow axial movement of the fiber optic cable relative to the elongated member.

16. The fiber optic cable guide of claim 1, wherein the at least one secondary securement element is configured to be crimpable around the fiber optic cable to thereby substantially preclude axial movement of the fiber optic cable relative to the elongated member.

17. The fiber optic cable guide of claim 1, wherein the middle section has at least two secondary securement elements.

18. The fiber optic cable guide of claim 17, wherein the at least two secondary securement elements are disposed at two different axial positions along the middle section of the elongated member.

19. The fiber optic cable guide of claim 17, wherein the at least two secondary securement elements are disposed opposite each other at a common axial position along the middle section end of the elongated member, thereby forming a substantially C-shape with the middle section.

20. The fiber optic cable guide of claim 1, wherein the at least one secondary securement element extends across a center of the channel.

21. The fiber optic cable guide of claim 1, wherein the elongated member is curved through about 90 degrees.

22. The fiber optic cable guide of claim 1, wherein the channel has a width that decreases in the direction of the first end to the second end.

23. The fiber optic cable guide of claim 1, wherein the elongated member includes at least one stiffening element.

24. The fiber optic cable guide of claim 23, wherein the at least one stiffening element includes two ribs extending along the elongated member proximate the secondary securement element.

25. The fiber optic cable guide of claim 23, wherein the elongated member defines an opening therethrough and the stiffening element is disposed proximate the opening.

26. A fiber optic cable guide for removable placement on a connectorized fiber optic cable assembly having a fiber optic cable and at least one connector subassembly, the fiber optic cable having a minimum bend radius, the fiber optic cable guide comprising:

an elongated member at least partially curved along its length with a radius of curvature not less than the minimum bend radius of the fiber optic cable for guiding the fiber optic cable in a desired direction, the elongated member having a first end, a second end, a middle section between the first and second ends, and a channel extending from the first end to the second end for receiving the fiber optic cable, the first end including a substantially C-shaped receptacle for releasably holding a portion of the connector subassembly, the second end including two primary securement elements extending from the second end, said primary securement elements extending from the second end to releasably hold at least the fiber optic cable, the middle section including one secondary securement element extending from the middle section to releasably hold at least the fiber optic cable, the primary securement elements being formed of a material that is sufficiently flexible to yield to the cable, and at least one of the primary securement elements being configured to extend over at least a portion of said channel so that upon application of a predetermined force to said cable, said cable is moved away from said channel, and said at least one primary securement element resiliently deflects allowing egress of said cable from said channel without damage to said cable.

27. The fiber optic cable guide of claim 26, wherein the secondary securement element is configured so that the fiber optic cable is releasable from the secondary securement element upon pulling of the fiber optic cable at a second predetermined force in the direction generally away from the bottom of the channel.

28. The fiber optic cable guide of claim 27, wherein the second predetermined force is greater than the first predetermined force.

29. The fiber optic cable guide of claim 27, wherein the second predetermined force is substantially equal to the first predetermined force.

30. The fiber optic cable guide of claim 26, wherein the connector subassembly includes a strain relief boot and the first end of the elongated member has a receptacle configured to be removably disposed around the boot.

31. The fiber optic cable guide of claim 26, wherein the elongated member includes at least one stiffening element.

32. A fiber optic cable guide for removable placement on a connectorized fiber optic cable assembly having a fiber optic cable and at least one connector subassembly including a strain relief boot, the fiber optic cable having a minimum bend radius, the fiber optic cable guide comprising:

an elongated member curved along its length with a radius of curvature not less than the minimum bend radius of the fiber optic cable, the elongated member having a first end, a second end, a middle section between the first and second ends, and a channel extending from the first end to the second end for receiving the fiber optic cable and the strain relief boot, the first end removably attached to the strain relief boot, the second end including at least one primary securement element extending from the second end to releasably hold the fiber optic cable to the elongated member substantially within the channel, the primary securement element being formed of a material that is sufficiently flexible to yield to the cable, and being configured to extend over at least a portion of said channel so that upon application of a predetermined force to said cable, said cable is moved away from said channel, and said primary securement element resiliently deflects allowing egress of said cable from said channel without damage to said cable.

33. The fiber optic cable guide of claim 32, further including at least one secondary securement element extending from the middle section to hold the strain relief boot and the fiber optic cable within the channel.

34. The fiber optic cable guide of claim 32, wherein the first end of the elongated member is configured to allow the elongated member to rotate 360 degrees relative to the connector subassembly.

35. The fiber optic cable guide of claim 32, wherein the elongated member is curved through about 90 degrees.

36. The fiber optic cable guide of claim 32, wherein the fiber optic cable guide is configured for use with two connectorized fiber optic cable assemblies, the elongated member first end having two receptacles, each receptacle configured to be removably disposed around portion of a respective connector subassembly, the second end including two sets of primary securement elements, each primary securement element configured to releasably hold a respective fiber optic cable to thereby guide the two fiber optic cables in a desired directions.

37. The fiber optic cable guide of claim 36, wherein the elongated member is forked.

38. The fiber optic cable guide of claim 36, wherein each connector subassembly includes a strain relief boot and each receptacle is disposed around a respective strain relief boot.

39. The fiber optic cable guide of claim 36, wherein the elongated member includes two channels extending from the first end to the second end, each channel for receiving a respective fiber optic cable.

40. The fiber optic cable guide of claim 39, wherein the primary securement elements are configured so that the respective fiber optic cables are releasable upon pulling of the fiber optic cable in a direction away from a bottom of the respective channel.

41. The fiber optic cable guide of claim 37, further including a middle section between the first and second ends and two secondary securement elements disposed on the middle section, each secondary securement element for holding a respective fiber optic cable.

42. The fiber optic cable guide of claim 36, wherein the elongated member is curved through about 90 degrees.

43. A method of removably fixing a fiber optic cable in a curvature not greater than that defined by a minimum bend radius of the fiber optic cable, a connector subassembly being disposed at at least one end of the fiber optic cable, the method comprising the steps of:

radially inserting the fiber optic cable into a first end of a guide member, the first end being configured to be disposed around a portion of the connector subassembly, the guide member being at least partially curved along its length with a radius of curvature not less than the minimum bend radius and defining a channel for receiving the fiber optic cable extending from the first end of the guide member to a second end of the guide member; and radially inserting the fiber optic cable in a direction toward the bottom of the channel past at least one securement element extending from the guide member spaced from the first end to hold the fiber optic cable to the guide member the securement element being formed of a material that is sufficiently flexible to yield to the cable as it is moved radially toward the channel, and being configured to extend over at least a portion of said channel so that as said cable is being inserted, said securement element resiliently deflects allowing ingress of said cable to said channel.

44. The method of claim 43, further including the step of inserting the fiber optic cable past at least another securement element axially spaced from the at least one securement element.

45. The method of claim 44, further including the step of crimping one of the securement elements over the fiber optic cable.

46. The method of claim 43, further including the step of axially sliding the guide member along the fiber optic cable after the first radially inserting step.

47. The method of claim 43, further including the step of removing the fiber optic cable from the guide member by pulling the cable radially from the at least one securement element.

48. The method of claim 43, further including the step of rotating the guide member relative to the fiber optic cable to a desired orientation after the radially inserting steps.

* * * * *